US008155521B2

(12) United States Patent
Chung et al.

(10) Patent No.: US 8,155,521 B2
(45) Date of Patent: Apr. 10, 2012

(54) MULTI-DEGREE CROSS-CONNECTOR SYSTEM, OPERATING METHOD AND OPTICAL COMMUNICATION NETWORK USING THE SAME

(75) Inventors: Hwan-Seok Chung, Daejeon (KR); Kwangloon Kim, Daejeon (KR); Sang-Soo Lee, Daejeon (KR); Sun-Hyok Chang, Daejeon (KR)

(73) Assignee: Electronics and Telecommunications Research Institute (KR)

( * ) Notice: Subject to any disclaimer, the term of this patent is extended or adjusted under 35 U.S.C. 154(b) by 368 days.

(21) Appl. No.: 12/514,977

(22) PCT Filed: Dec. 6, 2006

(86) PCT No.: PCT/KR2006/005251
§ 371 (c)(1),
(2), (4) Date: May 14, 2009

(87) PCT Pub. No.: WO2008/060007
PCT Pub. Date: May 22, 2008

(65) Prior Publication Data
US 2010/0027996 A1 Feb. 4, 2010

(30) Foreign Application Priority Data

Nov. 17, 2006 (KR) .................. 10-2006-0114097

(51) Int. Cl.
*H04J 14/00* (2006.01)
(52) U.S. Cl. ................ 398/50; 398/49; 398/48; 398/45; 398/89; 398/83; 398/82; 398/81
(58) Field of Classification Search ............ 398/50, 398/49, 48, 45, 89, 83, 82, 81
See application file for complete search history.

(56) References Cited

U.S. PATENT DOCUMENTS
2002/0146198 A1   10/2002   Strasser et al.
(Continued)

FOREIGN PATENT DOCUMENTS
KR   1020030048830 A   6/2003
(Continued)

OTHER PUBLICATIONS

Singhal, Narendra K, et al. "Architectures and Algorithm for Multicasting in WDM Optical Mesh Networks using Opaque and Transparent Optical Cross-Connects," Optical Fiber Communication Conference and Exhibit, vol. 2, 2001, pp. TuG8-1-TuG8-3.
(Continued)

*Primary Examiner* — Kinam Park
(74) *Attorney, Agent, or Firm* — Blakely, Sokoloff, Taylor & Zafman (57) ABSTRACT

Provided are a network node which has a wavelength switching cross-connection function and can thus interconnect paths of a wavelength-division-multiplexed optical signal and convert wavelengths, and an operating method of the network node. Accordingly, it is possible to provide a multi-degree cross-connection system having a simple structure at lower cost by allowing transmission of optical signals supposed not to be added/dropped at a network node without converting them into electrical signals and performing O/E conversion or E/O conversion only on optical signals supposed to be added/dropped at a network node. In addition, it is possible to increase the expandability of networks by regenerating degraded signals and which can effectively utilize bandwidths by grooming low-speed electrical digital hierarchy signals and transmitting them as high-speed optical signals. Moreover, it is possible to increase the availability of network resources by performing wavelength conversion without the need of additional wavelength converters. Furthermore, it is possible to prevent multiplexed optical signals from being degraded by filtering even when the multiplexed optical signals are not demultiplexed into wavelengths. Still furthermore, it is possible to perform a multicast operation on input wavelengths.

11 Claims, 8 Drawing Sheets

U.S. PATENT DOCUMENTS

| | | | | |
|---|---|---|---|---|
| 2002/0186432 | A1* | 12/2002 | Roorda et al. | 359/128 |
| 2002/0186434 | A1* | 12/2002 | Roorda et al. | 359/128 |
| 2003/0138252 | A1 | 7/2003 | Paiam et al. | |
| 2004/0153492 | A1 | 8/2004 | Cao et al. | |
| 2006/0045532 | A1 | 3/2006 | Yano | |

FOREIGN PATENT DOCUMENTS

| | | | |
|---|---|---|---|
| KR | 1020030087415 A | 11/2003 | |
| KR | 1020030088566 A | 11/2003 | |
| KR | 1020040055093 A | 6/2004 | |

OTHER PUBLICATIONS

Mukherjee, Biswanath, et al. "Traffic Grooming in Mesh Optical Networks," Optical Fiber Communication Conference, Technical Digest (CD) (Optical Society of America, 2004), paper ThG1.

Singhal, N., et al. "Dynamic Provisioning of Survivable Multicast Sessions in Optical WDM Mesh Networks," Tuesday Afternoon, vol. 1, OFC 2003, pp. 207-209.

\* cited by examiner

MULTI-DEGREE CROSS-CONNECTOR SYSTEM, OPERATING METHOD AND OPTICAL COMMUNICATION NETWORK USING THE SAME

This is a non-provisional application claiming the benefit of International application number PCT/KR2006/005251 filed Dec. 6, 2006.

TECHNICAL FIELD

The present invention relates to a multi-degree cross-connection system, an operating method of the multi-degree cross-connection system, and an optical communication network using the multi-degree cross-connection system, and more particularly, to a network node which has a wavelength switching cross-connection function and can thus interconnect paths of a wavelength-division-multiplexed optical signal and convert wavelengths, and an operating method of the network node.

BACKGROUND ART

With the advancement of the information society and the spread of the Internet, communication capacity has increased exponentially alongside the ever-growing demand for large-capacity optical communication.

As part of the efforts to keep up with the increase in communication capacity, methods of increasing the speed of transmission of optical signals have been suggested. These methods, however, cannot increase signal transmission speed over the current maximum of 10 Gbps or 40 Gbps. In order to address this, wavelength division multiplexing (WDM) has been widely adopted. WDM is an optical technology that simultaneously transmits a number of wavelengths using a single optical fiber.

Due to the development of WDM systems which multiplex a plurality of wavelengths into a single optical fiber and transmit the result of the multiplexing, networks have evolved from point-to-point static networks in which signals can only be transmitted via fixed paths into ring networks or mesh networks which can be dynamically configured according to necessity.

As transmission capacity increases, optical/electrical/optical cross-connection systems at ring or mesh network nodes, which convert wavelength-division-multiplexed optical signals into electrical signals and perform electrical processing, become more likely to become an electrical information processing bottleneck, and electrical information processing costs increase accordingly.

A cross-connection system having a simple structure can be provided at low cost by performing optical-to-electrical (O/E) conversion or electrical-to-optical (E/O) conversion only on optical signals with wavelengths that are supposed to be added/dropped at each network node while allowing transmission of optical signals with wavelengths that are supposed not to be added/dropped at each network node.

In the meantime, in the case of transmission of signals without a requirement of optical/electrical/optical conversion, nearly all types of electrical signals can be converted into and transmitted as optical signals regardless of their frame formats and the speed of transmission channels.

However, a network using an optical/optical/optical cross-connection system, unlike a network using an optical/electrical/optical cross-connection system which generate new signals for each network node, does not regenerate optical signals for intermediate network nodes, thereby causing degradation of optical signals and imposing restrictions on transmission distance and network expandability.

Electrical interconnection/grooming switches, which can be used in an optical/electrical/optical cross-connection system, perform switching in units of low-speed electrical digital hierarchy signals. More specifically, since electrical interconnection/grooming switches have a grooming function by which optical signals are classified into high-speed optical signals and low-speed optical signals and are reclassified according to their paths, and then combined, electrical interconnection/grooming switches can efficiently utilize bandwidths. On the contrary, optical switches, which can be used in an optical/optical/optical cross-connection system, handle high-speed signals and cannot efficiently utilize bandwidths because of their wide switching bandwidth.

In conclusion, a cross-connection system at each network node is required to minimize the number of O/E and E/O conversion operations and make an efficient use of bandwidths by passing therethrough optical signals that are supposed not to be added/dropped at a corresponding network node without converting them into electrical signals, performing O/E conversion only on optical signals that are supposed to be added/dropped at the corresponding network node, and grooming low-speed electrical digital hierarchy signals.

With the advent of Internet Protocol (IP) TV, Virtual Private Networks (VPNs), and Storage Area Networks (SAN), the demand for multicast technology for sending signals from one source to more than one destination at the same time has steadily increased.

Multicasting can reduce network traffic by integrating signals through common path into a single signal, transmitting the single signal by a predetermined distance, and enabling a branch network node to split the single signal and to transmit the split signal to each of a plurality of destinations, instead of creating a plurality of signals that are destined for different destinations and transmitting the signals separately.

Conventionally, electrical IP routers perform a multicast operation because they cannot provide a switching function in an optical communication network where IP signals are transmitted.

However, multicasting can be performed even in a physical layer by using an optical cross-connection system having an optical switching function and designing a network node to be able to perform a multicast function.

Figure 1:
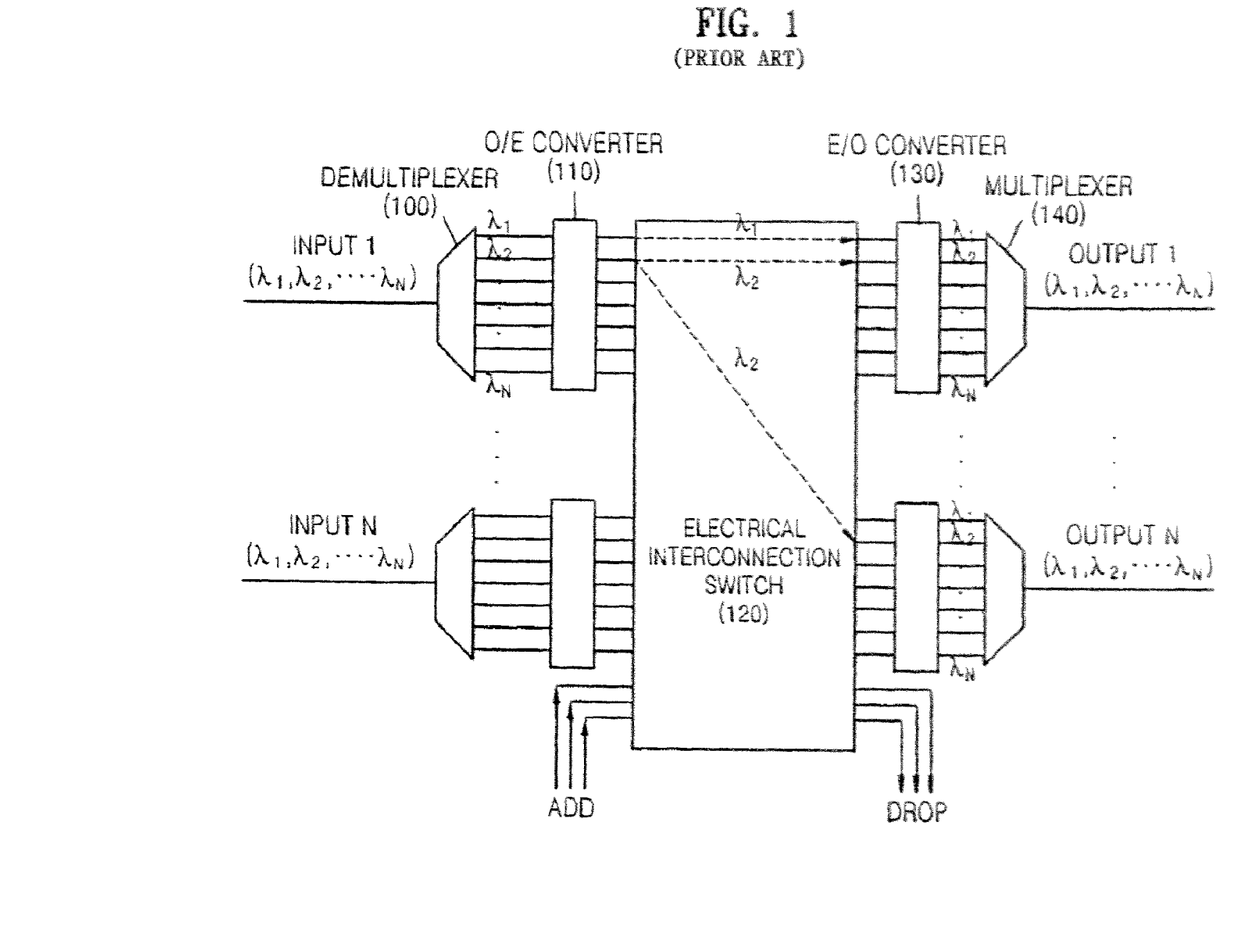
FIG. 1 illustrates a network node using a conventional optical/electrical/optical cross-connector.

FIG. 1 illustrates a network node using a conventional optical/electrical/optical cross-connection system. Referring to FIG. 1, the network node includes a demultiplexer 100, an O/E converter 110, an electrical interconnection/grooming switch 120, an E/O converter 130, and a multiplexer 140.

In order for the optical/electrical/optical cross-connection system to switch paths, a wavelength-division-multiplexed signal is demultiplexed into a plurality of wavelengths by the demultiplexer 100, and the demultiplexed signal is converted into an electrical signal through O/E conversion performed by the O/E converter 110.

The electrical interconnection/grooming switch 120 recombines or adds/drops the electrical signal provided by the O/E converter 110. An electrical signal provided by the electric interconnection/grooming switch 120 is converted into an optical signal through E/O conversion performed by the E/O converter 130.

The optical signal provided by the E/O converter 130 is multiplexed by the multiplexer 140. Thereafter, the multiplexed optical signal is output to each port.

The optical/electrical/optical cross-connection system subjects all wavelength-division-multiplexed signals to O/E conversion and then E/O conversion. Thus, as transmission capacity increases, the optical/electrical/optical cross-connection system become more likely to become an electrical information processing bottleneck and increase electrical information costs.

The electrical interconnection/grooming switch 120 can copy electrical signals. Thus, a multicast operation may be performed using the electrical interconnection/grooming switch 120.

Figure 2:
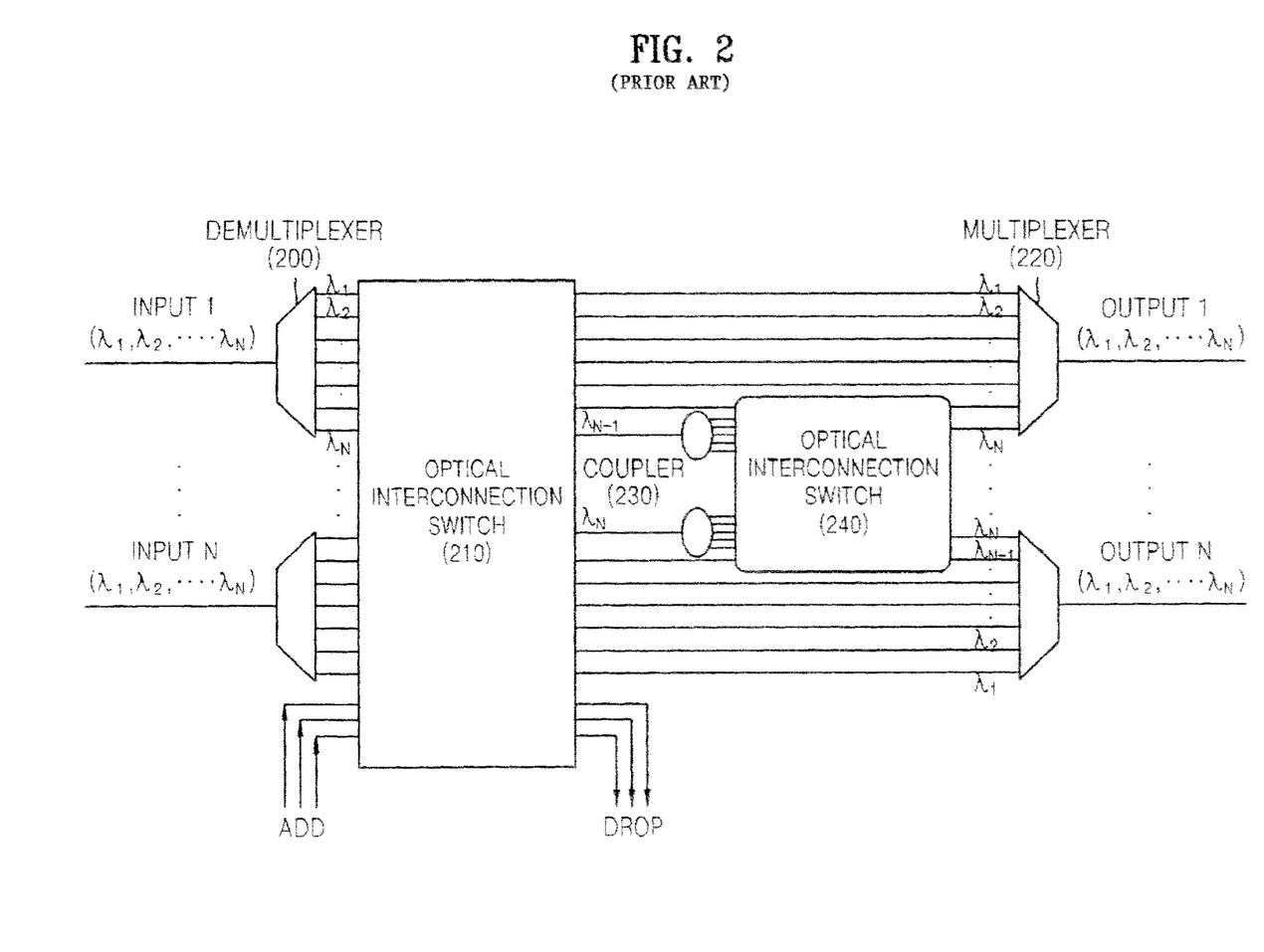
FIG. 2 illustrates a network node using a conventional optical/optical/optical cross-connector.

FIG. 2 illustrates a network node using a conventional optical/optical/optical cross-connection system. Referring to FIG. 2, the network node does not include an O/E converter and an E/O converter but includes an optical interconnection switch 240 which interconnects input and output ports.

In order to perform a multicast operation, a wavelength to be multicast may be set in advance and a signal may be copied into multiple paths by a coupler 230 and be switched to the multiple paths.

The network node illustrated in FIG. 2 has a simple structure because of the lack of an O/E converter. However, the network node illustrated in FIG. 2 cannot prevent degradation of optical signals. In addition, since the network node illustrated in FIG. 2 does not have a wavelength conversion function, the network node illustrated in FIG. 2 may cause a wavelength collision, thereby reducing the availability of network resources.

A network node using an optical/optical/optical cross-connection system (the net work node illustrated in FIG. 2) demultiplexes a multiplexed signal into a plurality of wavelengths and switches each of the wavelengths, thereby causing degradation of optical signals due to a filtering operation performed by an arrayed waveguide grating used for demultiplexing/multiplexing.

The network node illustrated in FIG. 2 determines in advance a wavelength to be multicast. Thus, as the number of output paths increases, the number of branches increases accordingly and thus, the network node illustrated in FIG. 2 is highly likely to result in loss of optical signals.

Figure 3:
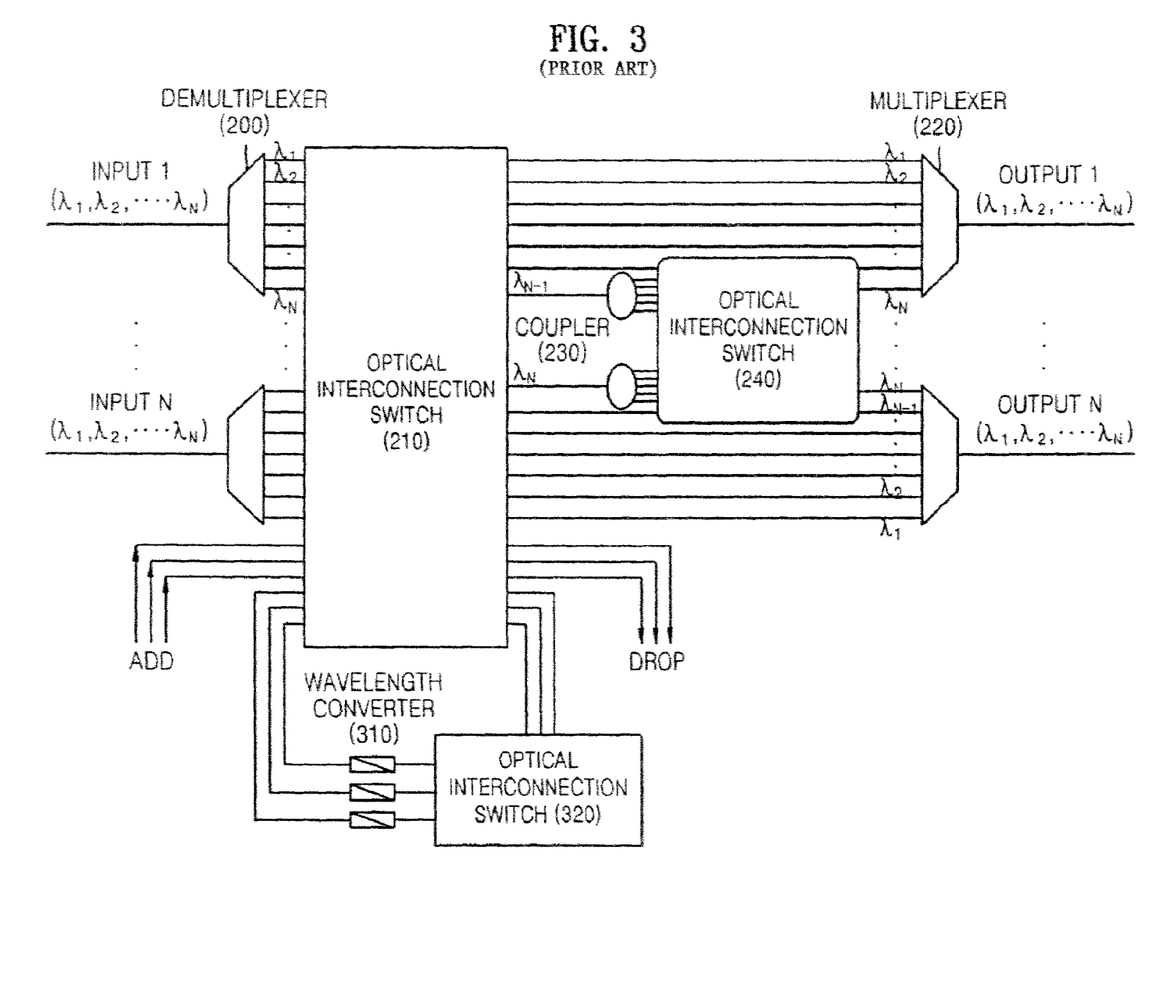
FIG. 3 illustrates a network node which can increase the availability of network resources by adding a wavelength converter to a conventional optical/optical/optical cross-connector.

FIG. 3 illustrates a network node which is capable of increasing the availability of network resources by adding a wavelength converter to a conventional optical/optical/optical cross-connection system. The network node illustrated in FIG. 3 is the same as the network node illustrated in FIG. 2 except that it further includes a wavelength converter 310 and an optical interconnection switch 320. The network node illustrated in FIG. 3 can prevent the availability of network resources from being reduced by a wavelength collision.

However, the network node illustrated in FIG. 3 is inefficient because it requires an additional wavelength converter, suffers from the same problems as the network node illustrated in FIG. 2, and fails to utilize bandwidths due to its wide switching bandwidth.

DETAILED DESCRIPTION OF THE INVENTION

Technical Problem

The present invention provides a multi-degree cross-connection system which has simple structure and can reduce the system's cost by allowing transmission of optical signals supposed not to be added/dropped at a network node as they are without converting them into electrical signals and performing optical-to-electrical (O/E) conversion or electrical-to-optical (E/O) conversion only on optical signals supposed to be added/dropped at a network node, and an operating method of the multi-degree cross-connection system.

The present invention also provides a multi-degree cross-connection system which can increase the expandability of networks by regenerating degraded signals and which can effectively utilize bandwidths by grooming low-speed electrical digital hierarchy signals and transmitting them as high-speed optical signals, and an operating method of the multi-degree cross-connection system.

The present invention also provides a multi-degree cross-connection system which can increase the availability of network resources by performing wavelength conversion without the need of additional wavelength converters, which can prevent multiplexed optical signals from being degraded by filtering even when the multiplexed optical signals are not demultiplexed, and which can perform a multicast operation on input wavelengths, and an operating method of the multi-degree cross-connection system.

Technical Solution

According to an aspect of the present invention, there is provided a multi-degree cross-connection system, including an optical coupler which splits an input optical signal comprising a plurality of wavelengths into a plurality of paths, a wavelength selective switch (WSS) which extracts at least one wavelength from the split optical signal and transmits the extracted wavelength to at least one output port or which extracts at least one wavelength from a split optical signal input to at least one port and transmits the extracted wavelength to an output port, and a cross-connection control system which control one or more wavelengths of an optical signal input to or output from the WSS.

DESCRIPTION OF THE DRAWINGS

The above and other features and advantages of the present invention will become more apparent by describing in detail exemplary embodiments thereof with reference to the attached drawings in which.

BEST MODE

Multi-degree cross-connection system and method according to the present invention will hereinafter be described in detail with reference to the accompanying drawing in which exemplary embodiments of the invention are shown.

Figure 4A:
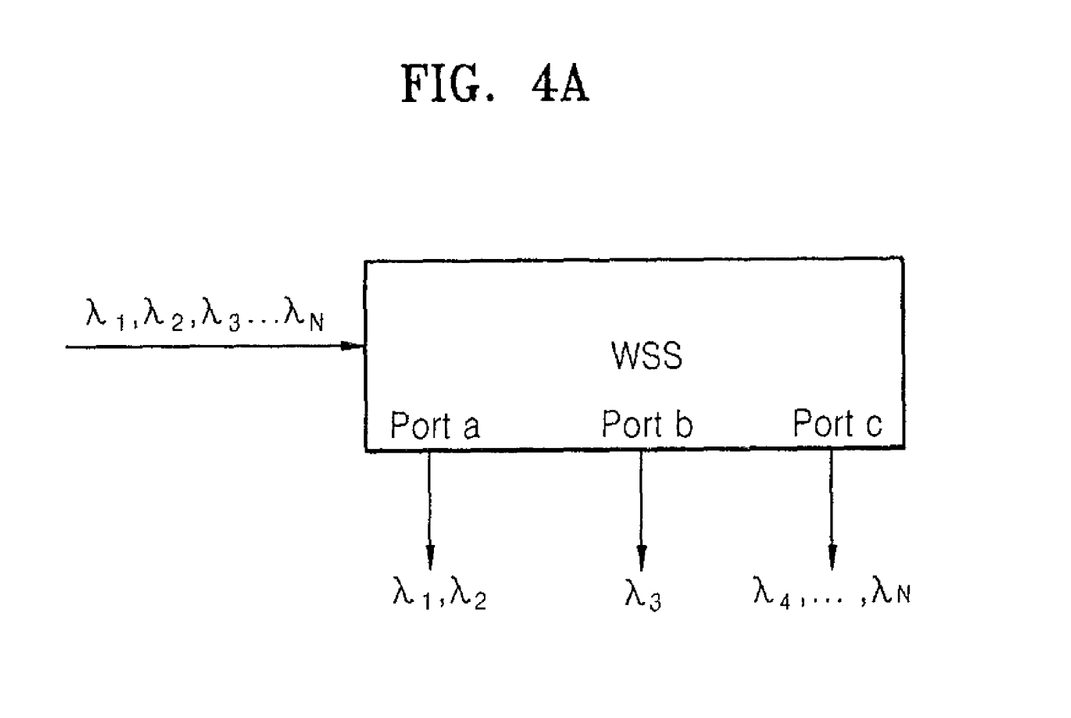
FIGS. 4A and 4B explain the operation of a wavelength selective switch (WSS), which is an essential element of a multi-degree cross-connection system according to an embodiment of the present invention.
Figure 4B:
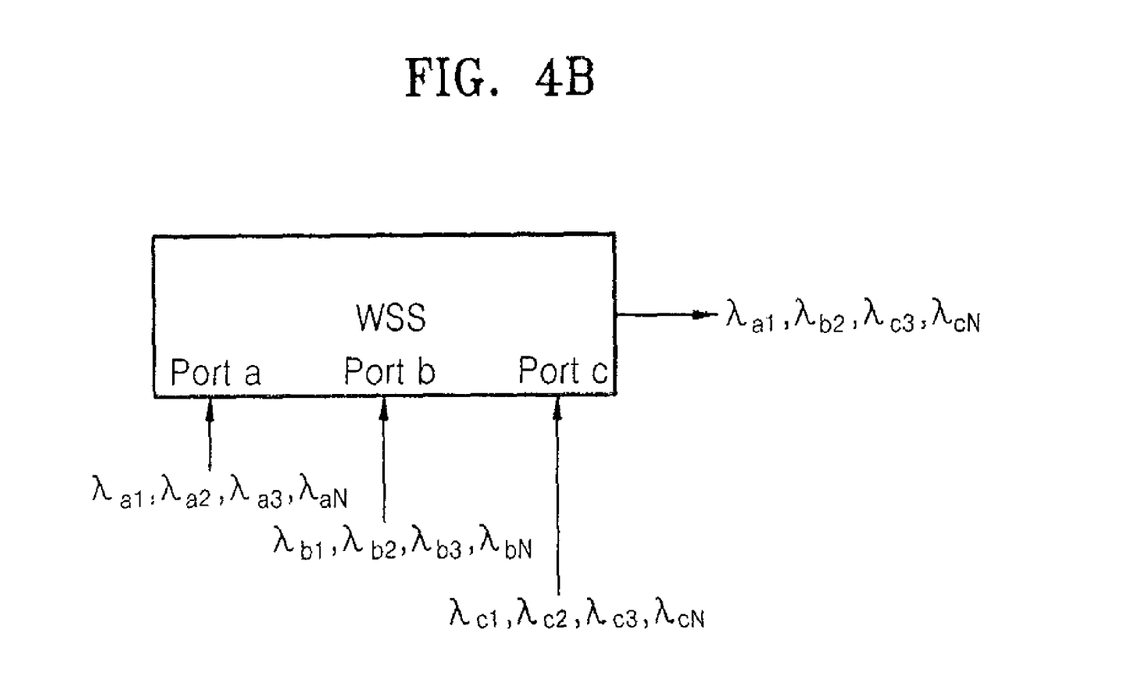

FIGS. 4A and 4B explain the operation of a wavelength selective switch (WSS), which is an essential element of a multi-degree cross-connection system according to an embodiment of the present invention.

Referring to FIG. 4A, a WSS can switch arbitrary wavelengths that are input to the same input port to different output ports.

For example, when wavelengths $\lambda_1, \lambda_2, \lambda_3, \ldots, \lambda_N$ are input to an input port, a WSS can switch the wavelengths $\lambda_1$ and $\lambda_2$ to port a, the wavelength $\lambda_3$ to port b, and the wavelengths $\lambda_4$ through $\lambda_N$ to port c.

Referring to FIG. 4B, a WSS can selectively pass arbitrary wavelengths that are input to different input ports through the same output port.

For example, when wavelengths $\lambda_{a1}, \lambda_{a2}, \lambda_{a3}, \ldots, \lambda_{aN}$ are input to port a, wavelengths $\lambda_{b1}, \lambda_{b2}, \lambda_{b3}, \ldots, \lambda_{bN}$ are input to port b, and wavelengths $\lambda_{c1}, \lambda_{c2}, \lambda_{c3}, \ldots, \lambda_{cN}$ are input to port c, a WSS can selectively pass the wavelengths $\lambda_{a1}$ of port a, $\lambda_{b2}$ and $\lambda_{c3}$ of port b, and $\lambda_N$ of port c through an output port and block the remaining wavelengths.

Figure 5:
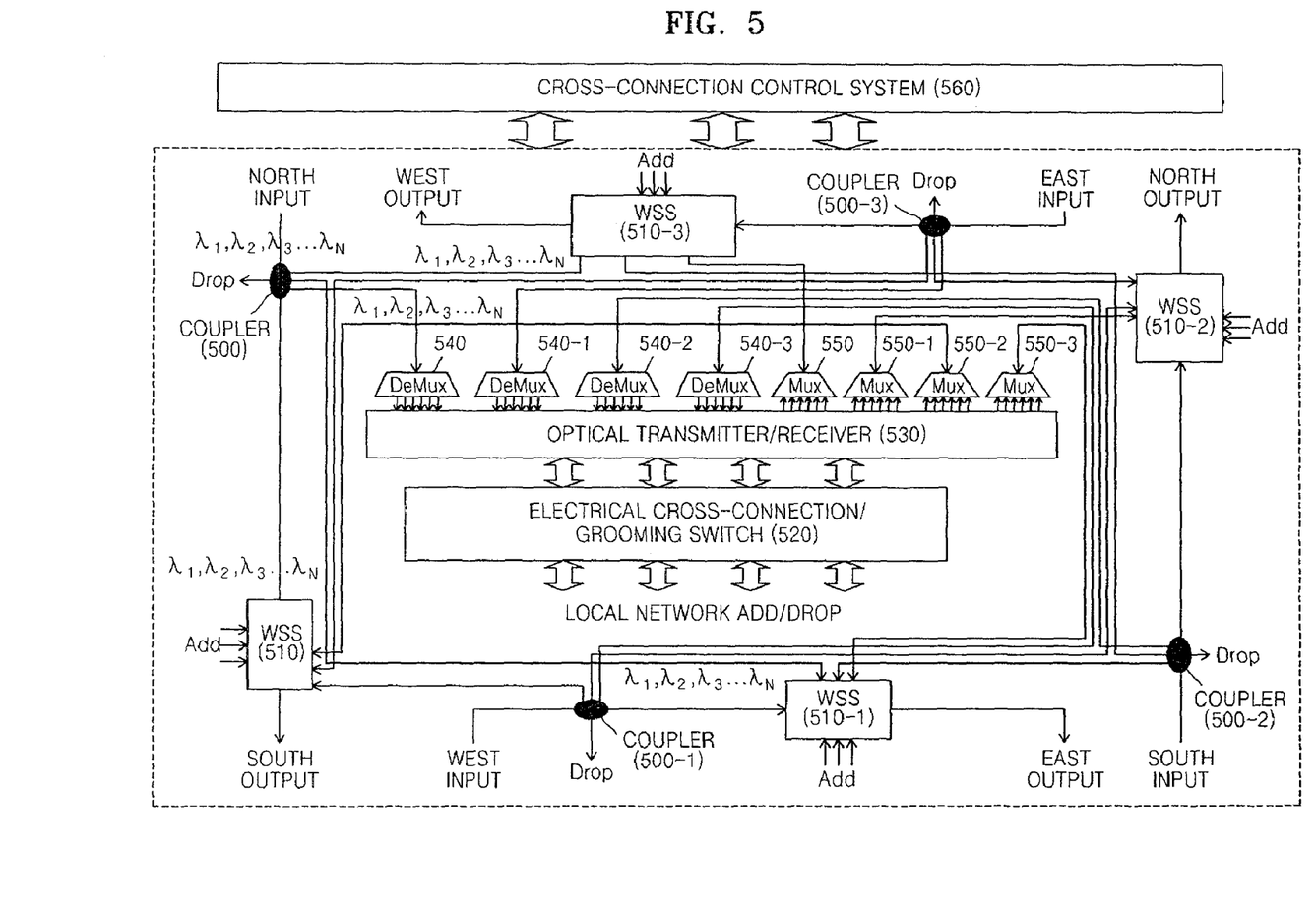
FIG. 5 illustrates a network node using a multi-degree cross-connection system according to an embodiment of the present invention.

FIG. 5 illustrates a network node using a multi-degree cross-connection system according to an embodiment of the present invention. Referring to FIG. 5, the multi-degree cross-connection system includes optical couplers 500, 500-1, 500-2, and 500-3, WSSs 510, 510-1, 510-2, and 510-3, demultiplexers 540, 540-1, 540-2, and 540-3, multiplexers 550, 550-1, 550-2, and 550-3, an electrical cross-connection/grooming switch 520, an optical transmission/reception module 530, and a cross-connection control system 560.

FIG. 5 illustrates a network node which can switch a signal input to a single input port to different destinations and add/drop a signal at a local network.

A wavelength-division-multiplexed optical signal which is input to a north input port is split into three paths by the optical couplers 500, 500-1, 500-2, and 500-3. Then, the three paths are respectively connected to the south output WSS 510, the west output WSS 510-3, and the east output WSS 510-1.

The WSSs 510, 510-1, 510-2, and 510-3 can selectively pass arbitrary wavelengths that are input to different input ports through the same output port, as described above with reference to FIG. 4B.

In addition, the WSSs 510, 510-1, 510-2, and 510-3 can adjust the amplitude of a signal input thereto according to the wavelength of the signal, and determine whether to block or transmit the signal therethrough.

The WSSs 510, 510-1, 510-2, and 510-3, which have the different output directions, block all signals but signals to be transmitted to output ports of the corresponding direction under the control of the control system 560.

Figure 6A:
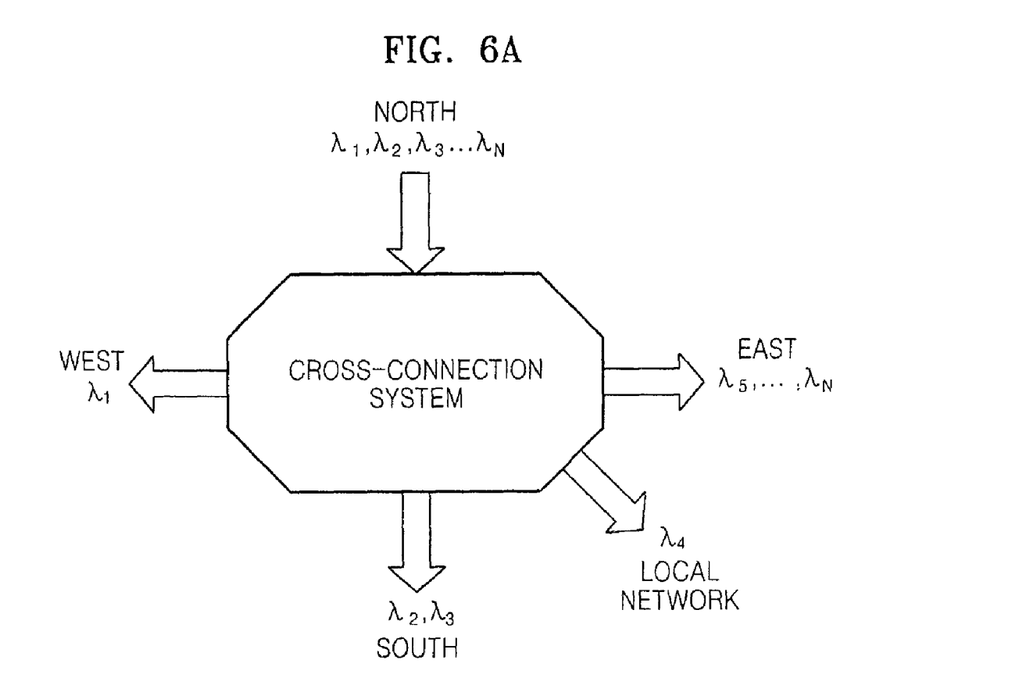
FIGS. 6A and 6B explain a unicast cross-connection function and a mixed unicast/multicast cross-connection function respectively performed by the network node illustrated in FIG. 5.
Figure 6B:
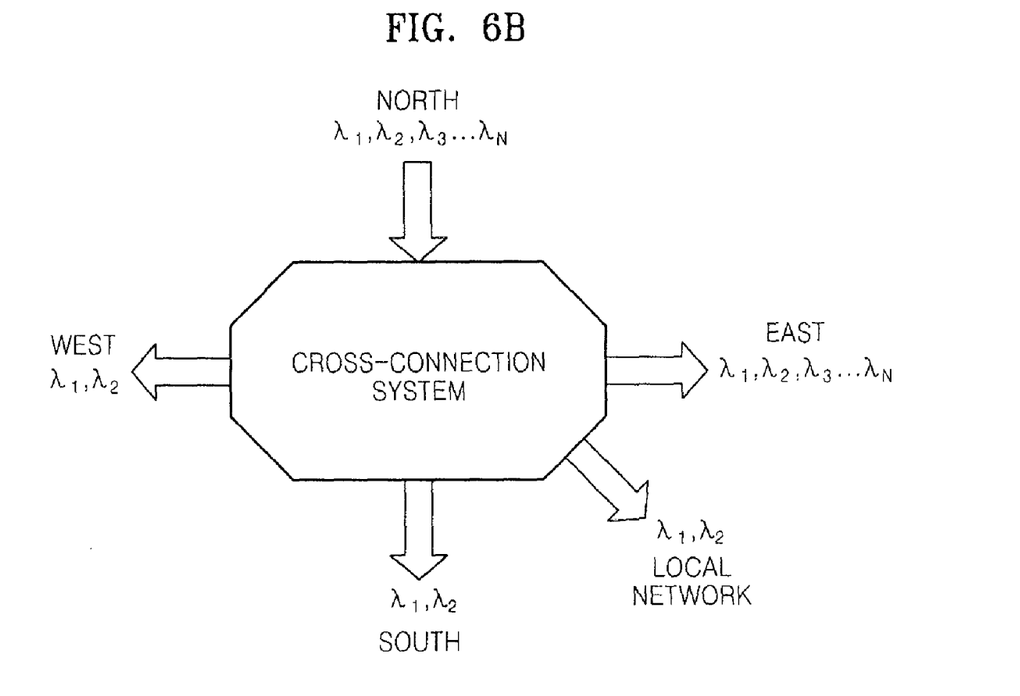

FIGS. 6A and 6B explain a unicast cross-connection function and a mixed unicast/multicast cross-connection function respectively performed by the network node.

Referring to FIG. 6A, when wavelengths $\lambda_1, \lambda_2, \lambda_3, \ldots, \lambda_N$ are received from a north input port, the wavelength $\lambda_1$ is switched to a west output port, the wavelengths $\lambda_2$ and $\lambda_3$ are switched to the south output port, and the wavelengths $\lambda_5$ through $\lambda_N$ are switched to the east output port. The wavelengths $\lambda_1, \lambda_2, \lambda_3, \lambda_5, \ldots, \lambda_N$ are transmitted to an electrical cross-connection switch to be added or dropped at a local network, and only the wavelength $\lambda_4$ is transmitted to the local network.

Referring to all the wavelengths dropped toward the electrical cross-connection/grooming switch 520, the optical transmission/reception module 530 eliminates all wavelengths that are supposed not to be dropped at the network node, instead of transmitting them to the electrical cross-connection/grooming switch 520.

In order to drop a signal at a local network without using an electrical cross-connection switch, an additional port provided to each direction input port can be used.

In this manner, the multi-degree cross-connection system according to the present embodiment can perform a unicast cross-connection function. The multi-degree cross-connection system according to the present embodiment, unlike a conventional cross-connection system, does not need to demultiplex signals according to the wavelengths of the signals in order to optically switch the signals. Thus, the multi-degree cross-connection system according to the present embodiment can prevent degradation of signals caused by filtering.

A multicast function provided by the multi-degree cross-connection system according to the present embodiment will hereinafter be described in detail with reference to FIG. 5.

Referring to FIG. 5, a wavelength-division-multiplexed optical signal which is input to the north input port is split into three paths by the optical couplers 500, 500-1, 500-2, and 500-3. Then, the split signals are respectively transmitted to the south output WSS 510, the west output WSS 510-3, and the east output WSS 510-1 through the three paths.

When wavelengths $\lambda_1, \lambda_2, \lambda_3, \ldots, \lambda_N$ are received from a north input port, the wavelengths $\lambda_1$ and $\lambda_2$ are switched to the west and to the south and the wavelengths $\lambda_1$ through $\lambda_N$ are switched to an electrical cross-connection switch and to the east under the control of the cross-connection control system 560. The wavelengths $\lambda_1$ and $\lambda_2$ are selectively transmitted to a local network. In this case, the wavelengths $\lambda_1$ and $\lambda_2$ are transmitted to the west, the south, the east, and the local network so that a multicast function can be performed. The wavelengths $\lambda_3$ through $\lambda_N$ are switched only to the east so that a unicast function can be performed.

Therefore, the WSSs 510, 510-1, 510-2, and 510-3 can selectively decide whether to allow transmission of the wavelengths $\lambda_1$ through $\lambda_N$ under the control of the cross-connection control system 540. Thus, the multi-degree cross-connection system according to the present embodiment can perform a multicast function for all channels input thereto.

The aforementioned function provided by the multi-degree cross-connection system according to the present embodiment involves allowing transmission of optical signals that are neither to be added nor dropped at the network node as they are without converting them into electrical signals.

The optical-to-electrical (O/E) or electrical-to-optical (E/O) conversion of a signal to be added or dropped at a local network will hereinafter be described in detail with reference to FIG. 5.

Referring to FIG. 5, a wavelength-division-multiplexed optical signal which is dropped toward the electrical cross-connection/grooming switch 520 is wavelength-division-demultiplexed by the demultiplexers 540, 540-1, 540-2, and 540-3, and the wavelength-division-demultiplexed optical signal is converted into an electrical signal by the optical transmission/reception module 530.

The optical transmission/reception module 530 eliminates all wavelengths that are supposed not to be dropped at the network node, instead of transmitting them to the electrical cross-connection/grooming switch 520.

The optical transmission/reception module 530 regenerates a degraded optical signal by restoring a clock signal and data during the conversion of a wavelength-division-multiplexed optical signal into an electrical signal. In this manner, the optical transmission/reception module 530 can obtain a clean electrical signal.

A clean electrical signal obtained by the optical transmission/reception module 530 is transmitted to the electrical cross-connection/grooming switch 520.

The electrical cross-connection/grooming switch 520 splits the electrical signal transmitted thereto into signal components to be dropped at a local network and signal components to be retransmitted to the east, the west, and the south. The electrical cross-connection/grooming switch 520 drops the signal components to be dropped at a local network. The electrical cross-connection/grooming switch 520 recombines the signal components to be retransmitted to the east, the west, and the south and signal components to be added at a local network, thereby obtaining a high-speed signal needed for optical transmission.

The high-speed signal is transmitted to the optical transmission/reception module 530. Then, the optical transmission/reception module 530 converts the high-speed signal into an optical signal. The optical signal is wavelength-division-multiplexed by the multiplexers 550, 550-1, 550-2, and 550-3, and the wavelength-division-multiplexed optical signal is transmitted to the WSSs 510, 510-1, 510-2, and 510-3.

The multi-degree cross-connection system according to the present embodiment can effectively utilize bandwidths by recombining low-speed electrical digital hierarchy unit signals with other unit signals with the use of the electrical cross-connection/grooming switch 520.

Also, the multi-degree cross-connection system according to the present embodiment can increase the availability of network resources by performing wavelength conversion without the need of additional wavelength converters.

Figure 7:
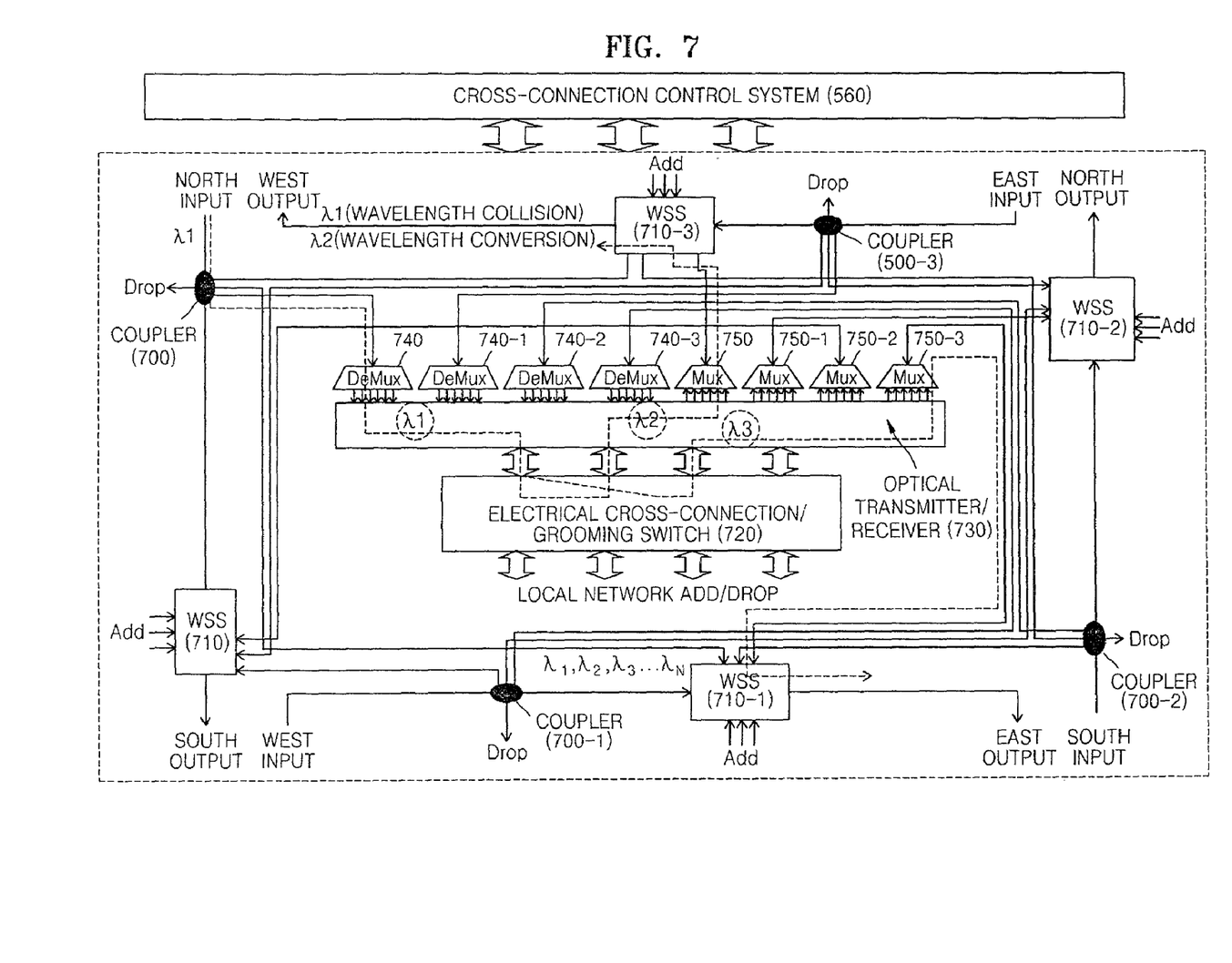
FIG. 7 illustrates a network node using a multi-degree cross-connection system according to another embodiment of the present invention.

FIG. 7 illustrates a network node using a multi-degree cross-connection system according to another embodiment of the present invention. Referring to FIG. 7, if a wavelength $\lambda_1$ input from a north input port is transmitted to a west output port when the wavelength $\lambda_1$ is already used by the west output port, a wavelength collision may occur, thereby making it impossible to transmit signals.

In this case, a west output WSS 710-3 blocks the wavelength $\lambda_1$.

In detail, the wavelength $\lambda_1$, which is selected from a wavelength-division-multiplexed optical signal dropped at a local network, is converted into an electrical signal by an optical transmission/reception module 730, and an electrical cross-connection/grooming switch 720 switches the electrical signal to a $\lambda_2$ optical transmitter which is disposed in the optical transmission/reception module 730 and connected to a west output port. Then, the $\lambda_2$ optical transmitter converts the electrical signal into a wavelength $\lambda_2$ and the wavelength $\lambda_2$ to the west output port.

The aforementioned wavelength conversion operation is performed using the optical transmission/reception module 720, instead of using an additional wavelength converter. Thus, there is no need to provide an additional wavelength converter.

The electrical cross-connection/grooming switch 720 can electrically copy a signal. Thus, while converting the wavelength $\lambda_1$ into the wavelength $\lambda_2$ and transmitting the wavelength $\lambda_2$ to the west output port, the electrical cross-connection/grooming switch 720 can copy the wavelength $\lambda_1$ and transmit it to a $\lambda_3$ transmitter that is disposed in the optical transmission/reception module 730 and connected to an east output port, so that the wavelength $\lambda_1$ can be output to the east output port as a wavelength $\lambda_3$.

Therefore, it is possible to properly perform a multicast operation by using the electrical cross-connection/grooming switch 720 and preventing a wavelength collision or signal degradation that would have been caused otherwise.

According to the present embodiment, a wavelength to be multicast may be the same as or different from an input wavelength.

Figure 8A:
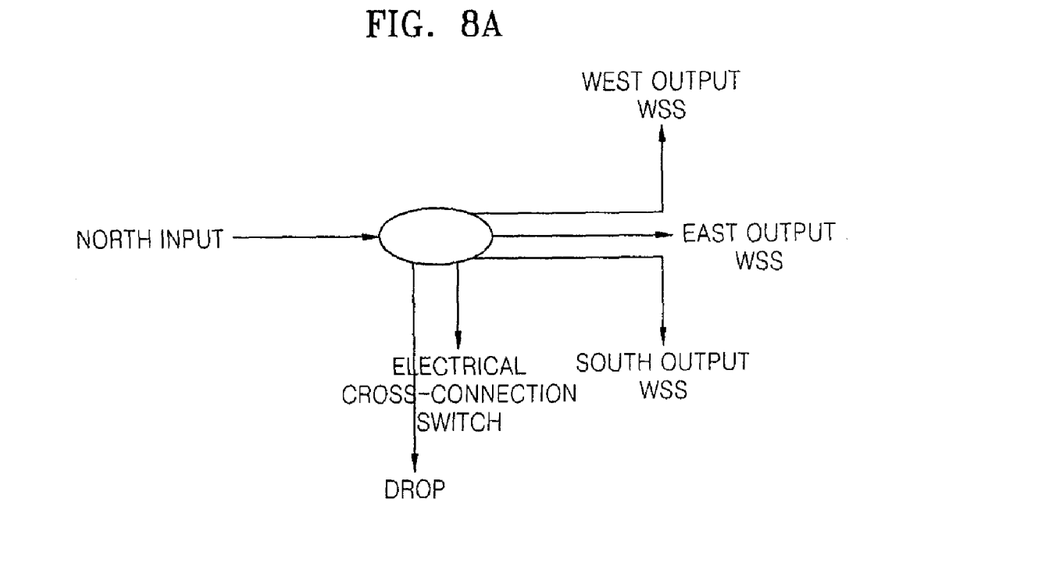
FIGS. 8A and 8B illustrate network nodes using a multi-degree cross-connection system according to another embodiment of the present invention.
Figure 8B:
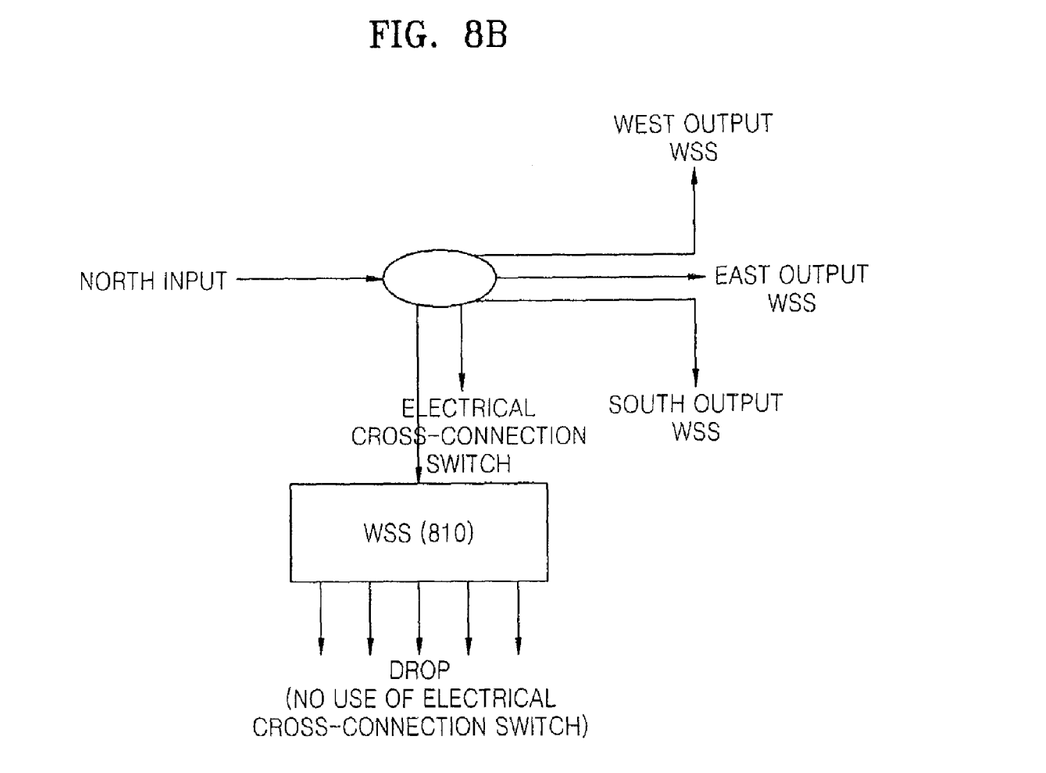

FIGS. 8A and 8B illustrate network nodes using a multi-degree cross-connection system according to another embodiment of the present invention. More specifically, FIG. 8A illustrates part of the optical coupler 500 illustrated in FIG. 5.

Referring to FIGS. 8A and 8B, in order to drop optical signals at a local network without the use of an electrical cross-connection switch, an additional port of a coupler which is disposed at each directional input port may be used. Optical signals can be selectively dropped by connecting a WSS to the additional port.

According to the present embodiment, an optical signal input from the north is switched toward other directions. However, the present invention is not restricted to this.

In other words, the operating principles of the present invention can also be applied to the switching of optical signals input from the south, the east, and the west.

In the present embodiment, a 4-degree switching architecture comprising one input port, three output ports, and one branch is provided. However, a multi-degree cross-connection system may be configured by increasing or reducing the number of branches of an optical coupler and the number of WSSs, and this is within the scope of the present invention.

The multi-degree cross-connection system according to the present embodiment may also include an optical amplifier and dispersion compensation optical fibers for the amplification and compensation of optical signals.

It is possible to establish network nodes using the multi-degree cross-connection system according to the present invention and to establish a WDM optical communication network by connecting optical fibers and optical amplifiers between such network nodes.

INDUSTRIAL APPLICABILITY

As described above, according to the present invention, it is possible to provide a multi-degree cross-connection system having a simple structure at lower cost by allowing transmission of optical signals supposed not to be added/dropped at a network node without converting them into electrical signals and performing O/E conversion or E/O conversion only on optical signals supposed to be added/dropped at a network node. In addition, it is possible to increase the expandability of networks by regenerating degraded signals and which can effectively utilize bandwidths by grooming low-speed electrical digital hierarchy signals and transmitting them as high-speed optical signals. Moreover, it is possible to increase the availability of network resources by performing wavelength conversion without the need of additional wavelength converters. Furthermore, it is possible to prevent multiplexed optical signals from being degraded by filtering even when the multiplexed optical signals are not demultiplexed into wavelengths. Still furthermore, it is possible to perform a multicast operation on input wavelengths.

The invention claimed is:
1. A multi-degree cross-connection system comprising:
   an optical coupler which splits an input optical signal comprising a plurality of wavelengths into a plurality of paths;
   a wavelength selective switch (WSS) which extracts a plurality of wavelengths from the split optical signal and selectively transmits the extracted wavelengths to at least one output port; and a plurality of optical receivers, each optical receiver converting a predetermined wavelength that is selected from among the extracted wavelengths into an electrical signal;

an electrical cross-connection/grooming switch which outputs an electrical signal to be transmitted to a local network and grooms the electrical signal to be transmitted to the local network by combining it with a signal input from the local network;

a cross-connection control system which controls wavelengths of the optical signals input to the WSS and output from the at least one output port.

2. The multi-degree cross-connection system of claim 1, wherein the optical coupler splits the intensity of the input optical signal into a plurality of paths.

3. The multi-degree cross-connection system of claim 1, wherein a number of branches of the optical coupler is increased and a number of WSSs is increased.

4. The multi degree cross-connection system of claim 1, further comprising an optical amplifier which amplifies the input optical signal or a wavelength transmitted to an output port of the WSS.

5. The multi-degree cross-connection system of claim 1, further comprising dispersion compensation optical fibers which compensate for dispersion of a wavelength transmitted to an output port of the WSS.

6. The multi-degree cross-connection system of claim 1, wherein one or more output ports of the WSS output different wavelengths of the input optical signal.

7. The multi-degree cross-connection system of claim 1, wherein one or more output ports of the WSS output at least one wavelength of the input optical signal in common.

8. The multi-degree cross-connection system of claim 1, further comprising:

a demultiplexer which demultiplexes the split optical signal into one or more wavelengths;

a plurality of optical transmitters, each optical transmitter transmitting the groomed electrically signal into an optical signal with a predetermined wavelength; and a multiplexer which multiplexes the optical signal provided by the optical transmitters.

9. The multi-degree cross-connection system of claim 8, wherein the WSS receives the multiplexed optical signal via at least one port, extracts at least one wavelength from the received optical signal, and transmits the extracted wavelength to at least one output port, and the cross-connection control system controls each of the optical receivers and the optical transmitters.

10. The multi-degree cross-connection system of claim 8, w herein the optical receivers and the optical transmitters handle different wavelengths.

11. An optical communication network established based on the multi-degree cross connection system of claim 1 or 8.

* * * * *